United States Patent [19]

Ward

[11] 4,429,053

[45] Jan. 31, 1984

[54] RARE EARTH-CONTAINING Y ZEOLITE COMPOSITIONS

[75] Inventor: John W. Ward, Yorba Linda, Calif.

[73] Assignee: Union Oil Company of California, Calif.

[21] Appl. No.: 327,611

[22] Filed: Dec. 4, 1981

[51] Int. Cl.$^3$ .......................... B01J 29/12; B01J 37/10

[52] U.S. Cl. ....................................... 502/65; 502/73; 208/120

[58] Field of Search ................................... 252/455 Z

[56] References Cited

U.S. PATENT DOCUMENTS

| | | | |
|---|---|---|---|
| 3,507,812 | 4/1970 | Smith et al. | 252/455 Z |
| 3,546,100 | 10/1968 | Yan | 252/455 Z |
| 3,720,601 | 3/1973 | Coonradth et al. | 252/455 Z |

*Primary Examiner*—Carl F. Dees
*Attorney, Agent, or Firm*—Gregory F. Wirzbicki; Dean Sandford

[57] ABSTRACT

Y Zeolites are prepared with rare earth cations and Group VIII metal cations exchanged thereinto, such zeolites being especially useful in hydrocracking catalysts. The zeolites of the invention are prepared by exchanging a sodium Y zeolite with cations of one or more rare earth elements followed by a calcination, an ammonium ion exchange, and a Group VIII metal cation exchange. The resultant zeolite is not only highly active for catalytically promoting hydrocracking reactions but is also, after use in hydrocracking environments resulting in coke deposition, essentially completely regenerable by combustion of the coke.

42 Claims, 1 Drawing Figure

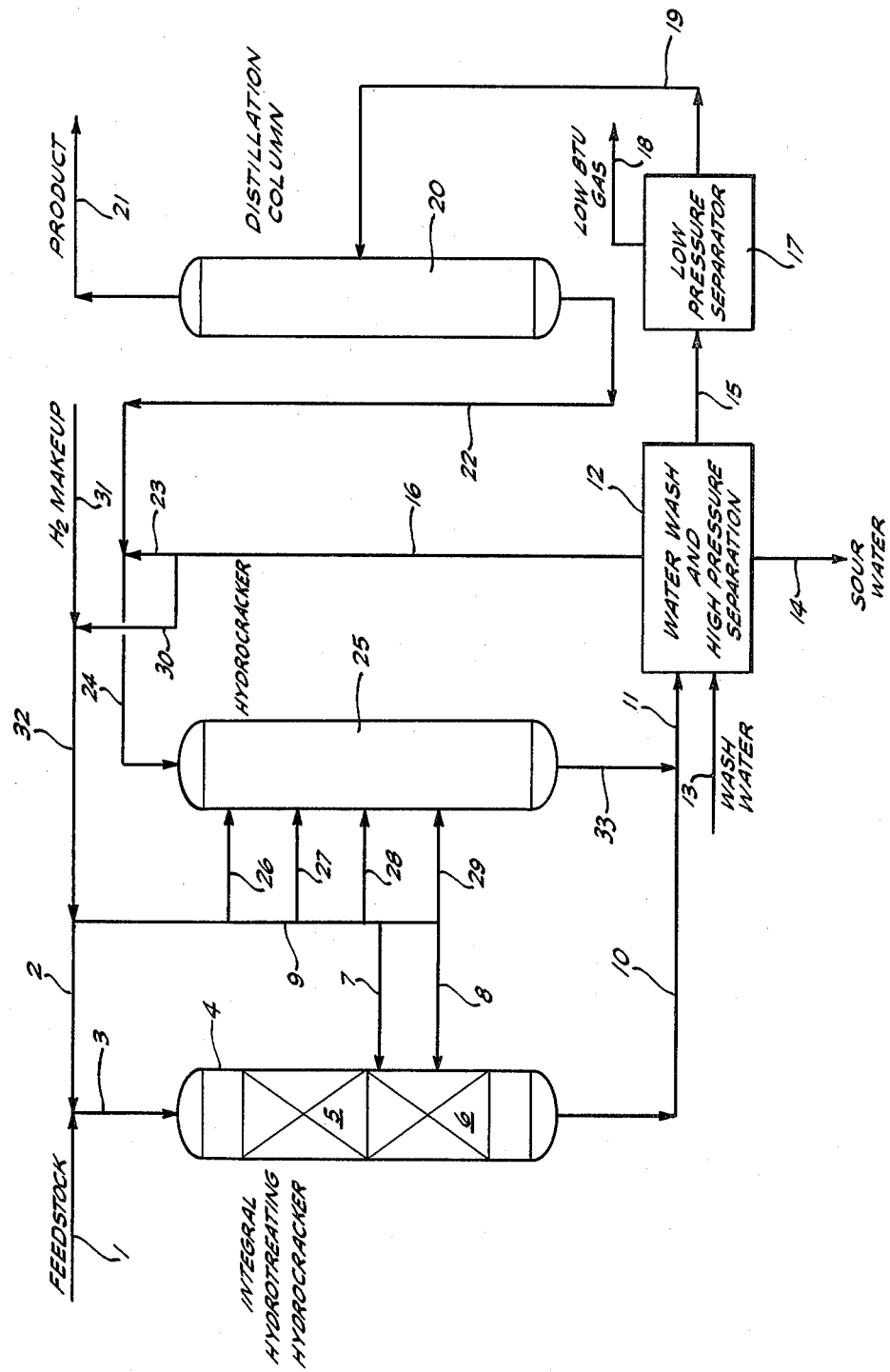

RARE EARTH-CONTAINING Y ZEOLITE COMPOSITIONS

BACKGROUND OF THE INVENTION

This invention relates to a catalytic hydrocracking process and a regenerable catalyst for use therein. More particularly, the invention relates to a hydrocracking catalyst, and most especially to noble metal, zeolitic hydrocracking catalysts, having highly improved regeneration properties.

Petroleum refiners often produce desirable products, such as gasoline and turbine fuel, by catalytically hydrocracking high boiling hydrocarbons into product hydrocarbons of lower average molecular weight and boiling point. Hydrocracking is generally accomplished by contacting, in an appropriate reactor vessel, a gas oil or other hydrocarbon feedstock with a suitable hydrocracking catalyst under appropriate conditions, including an elevated temperature and an elevated pressure and the presence of hydrogen, such that a hydrocarbon product is obtained containing a substantial proportion of a desired product boiling in a specified range, as for example, a gasoline boiling in the range of 185° to 420° F.

Oftentimes, hydrocracking is performed in conjunction with hydrotreating, usually by a method referred to as "integral operation." In this process, the hydrocarbon feedstock, usually a gas oil containing a substantial proportion of components boiling above a desired end point, as for example, 420° F. in the case of certain gasolines, is introduced into a catalytic hydrotreating zone wherein, in the presence of a suitable catalyst, such as a non-zeolitic, particulate catalyst comprising a Group VIII metal component and a Group VIB metal component on a porous refractory oxide support most often composed of alumina, and under suitable conditions, including an elevated temperature (e.g., 400° to 1000° F.) and an elevated pressure (e.g., 100 to 5000 p.s.i.a.) and with hydrogen as a reactant, the organonitrogen components and the organosulfur components contained in the feedstock are converted to ammonia and hydrogen sulfide, respectively. Subsequently, the entire effluent removed from the hydrotreating zone is treated in a hydrocracking zone maintained under suitable conditions of elevated temperature, pressure, and hydrogen partial pressure, and containing a suitable hydrocracking catalyst, such that a substantial conversion of high boiling feed components to product components boiling below the desired end point is obtained. Usually, the hydrotreating and hydrocracking zones in integral operation are maintained in separate reactor vessels, but, on occasion, it may be advantageous to employ a single, downflow reactor vessel containing an upper bed of hydrotreating catalyst particles and a lower bed of hydrocracking particles. Examples of integral operation may be found in U.S. Pat. Nos. 3,132,087, 3,159,564, 3,655,551, and 4,040,944, all of which are herein incorporated by reference.

In some integral operation refining processes, and especially those designed to produce gasoline from the heavier gas oils, a relatively high proportion of the product hydrocarbons obtained from integral operation will have a boiling point above the desired end point. For example, in the production of a gasoline product boiling in the $C_4$ to 420° F. range from a gas oil boiling entirely above 570° F., it may often be the case that as much 30 to 60% by volume of the products obtained from integral operation boil above 420° F. To convert these high boiling components to hydrocarbon components boiling below 420° F., the petroleum refiner separates the 420° F.+ high boiling components from the other products obtained in integral operation, usually after first removing ammonia by a water washing operation, a hydrogen-containing recycle gas by high pressure separation, and an $H_2S$-containing, $C_1$ to $C_3$ low BTU gas by low pressure separation. The resultant denitrogenated and desulfurized liquid is then distilled into a $C_4$ to 420° F. overhead gasoline product and a 420° F.+ unconverted fraction. This bottom fraction is then subjected to further hydrocracking in a second hydrocracking zone wherein yet more conversion to the desired $C_4$ to 420° F. product takes place.

In the foregoing process, the two hydrocracking reaction zones often contain hydrocracking catalysts of the same composition. One catalyst suitable for such use is disclosed as Catalyst A in Example 16 of U.S. Pat. No. 3,897,327, herein incorporated by reference in its entirety, which catalyst is comprised of a palladium-exchanged stabilized Y zeolite hydrocracking component. But although the catalysts used in the two hydrocracking reaction zones may have the same composition and the same catalytic properties, the hydrocracking conditions required in the second hydrocracking reaction zone are less severe than those required in the first. The reason for this is that ammonia is not present in the second hydrocracking reaction zone (due to water washing) whereas a significant amount of ammonia is present in the first hydrocracking zone. To account for the difference in operating conditions, it is believed that ammonia neutralizes or otherwise interferes with the acidity of the zeolite in the catalyst of the first reaction zone, thereby forcing the refiner to employ relatively severe conditions for operation, as for example, increased temperature. On the other hand, in the ammonia-deficient atmosphere of the second hydrocracking reaction zone, high conversions to the desired product are obtainable under relatively moderate conditions, often with an operating temperature about 150° to 210° F. lower than that required in the first hydrocracking reaction zone.

It has been discovered, however, that a difficult problem presents itself when the hydrocracking catalyst in the second hydrocracking zone must be regenerated. During hydrocracking, coke materials deposit on the catalyst particles, and since the coke obviously interferes with the activity of the catalyst, it is necessary to periodically regenerate the catalyst by combustion of the coke. Curiously, however, it has been found that, after regeneration, the catalyst used in the second hydrocracking reaction zone loses substantial activity for hydrocracking under the relatively moderate conditions employed therein. Even more curiously, it has been found that, assuming identical catalysts are used in the two hydrocracking zones, both remain useful after regeneration for use in the first reaction zone, but both exhibit substantial activity losses compared to fresh catalyst if used in the second hydrocracking reaction zone.

Many attempts have been made to overcome the detrimental effects associated with regenerating hydrocracking catalysts for use in the ammonia-deficient environments of the second hydrocracking zone, and particularly with respect to catalysts containing noble metal-exchanged zeolites. But these attempts have largely focused on methods for restoring some or all of the catalytic activity lost through regeneration or other high temperature operation. These restoration (or rejuvenation) methods generally involve treating the regenerated catalyst or the coked catalyst prior to regeneration with an ammonium salt, ammonium hydroxide, gaseous ammonia, or mixtures thereof. Descriptions of typical prior art rejuvenation methods employing ammoniated media may be found in U.S. Pat. Nos. 3,692,692, 3,835,028, 3,849,293, 3,899,441, 3,943,051, 4,002,575, 4,107,031, 4,139,433, and 4,190,553. The general theory behind these methods is that the activity losses of catalysts used in hydrocracking environments are caused by the agglomeration of the otherwise dispersed Group VIII active metal hydrogenation component, and the ammoniation treatments of the prior art aim to reverse this mechanism and redisperse the Group VIII active metal component.

Although the prior art methods have met with some success, a major difficulty in their use is that the rejuvenation of the catalyst must be performed under carefully controlled conditions in the presence of ammonia or an ammonium ion-containing medium, with all the attendant equipment and chemical costs associated therewith. Further, and far more importantly, by focusing on rejuvenation procedures, the prior art has aimed at correcting a problem (catalyst deactivation) once it has come into existence rather than preventing the problem by providing a catalyst resistant to deactivation during regeneration. Further still, the prior art procedures are of only limited usefulness, being applicable, for example, to catalysts containing palladium-exchanged zeolites stabilized with magnesium cations but being of at most only limited usefulness with many other hydrocracking catalysts. As an illustration, hydrocracking catalysts containing hydrogen-palladium zeolites have been found to be highly sensitive to ammonia or ammonium ion treatments, with collapse of the zeolitic crystal structure and virtually complete loss of catalytic activity being the end result of such treatment.

Accordingly, it is a major object of the invention to provide a zeolitic hydrocracking catalyst resistant to deactivation during regeneration and other high temperature operations. It is a further object to provide a Group VIII metal-exchanged zeolite, and particularly a noble metal-exchanged zeolite, and a method for preparing such a zeolite, which is useful in a hydrocracking catalyst and resistant to losses in catalytic activity under high temperature conditions, particularly the high temperature oxidizing conditions that pertain during regeneration of hydrocracking catalysts. Yet another object of the invention is to provide a noble metal-exchanged, zeolitic hydrocracking catalyst, and a method for preparing such a catalyst, for use in a catalytic hydrocracking process wherein high temperature regenerations of the catalyst are periodically required without incurring substantial losses in catalytic hydrocracking activity. A further object is to provide a hydrocracking process taking advantage of the regeneration-resistant properties of the zeolite and hydrocracking catalyst of the invention. These and other objects of the invention will become more clear in light of the following description of the invention.

SUMMARY OF THE INVENTION

The present invention is founded on the discovery that hydrocracking catalysts used in ammonia-deficient hydrocracking environments may be dramatically improved by utilizing as the zeolite component certain Y type zeolites containing a rare earth metal and a Group VIII metal, and in particular certain Y type zeolites containing a rare earth metal and a noble metal. Accordingly, the invention is directed to a zeolite of highly improved properties, particularly with respect to resisting losses in hydrocracking activity when regeneration by coke combustion is necessary after service in ammonia-deficient hydrocracking environments. In its broadest embodiment, the zeolite of the invention is a composition prepared by cation exchanging a zeolite of the Y type with cations of one or more rare earth metals followed by a calcination, an ion exchange with ammonium ions, and an ion exchange with Group VIII metal cations.

In one embodiment of the invention, especially useful in hydrocracking, the zeolite is prepared by cation exchanging a sodium Y zeolite with rare earth cations, steam calcining the resulting rare earth-exchanged zeolite, usually so as to effect at least some reduction in the zeolite unit cell size, and subsequently subjecting the zeolite to an ammonium ion exchange and an exchange with noble metal cations. In another embodiment useful in hydrocracking, a zeolite is prepared by the cation exchange of a sodium Y zeolite with rare earth cations followed by (1) a steam calcination, usually so as to result in some shrinkage in the zeolite unit cell size, (2) an ammonium ion exchange, (3) an optional calcination, (4) a cation exchange of a noble metal into the zeolite, and (5) a final calcination.

Zeolites of the invention have been found to have catalytic activity with respect to hydrocarbon conversion reactions, and for catalytic purposes, the zeolite of the invention is usually admixed with a refractory oxide component, such as alumina in a hydrous gel form, prior to the final calcination. Catalysts of the invention are useful in a variety of hydrocarbon conversion processes, and especially in hydrocracking processes, with particular use being found in a hydrocracking process employing an ammonia-deficient environment. In one specific embodiment of the invention, the hydrocracking catalyst of the invention is employed in the second hydrocracking zone of a petroleum refining process wherein a hydrocarbon feedstock is firstly treated in a petroleum refining process employing an integral hydrotreating-hydrocracking operation followed by further hydrocracking of unconverted components in a second hydrocracking zone wherein an ammonia-deficient environment is maintained.

BRIEF DESCRIPTION OF THE DRAWING

The drawing depicts, in flow sheet format, a preferred embodiment of the process of the invention for refining hydrocarbons, in which process a catalyst containing the novel zeolite of the invention is employed. For the sake of simplicity, many conventional items normally utilized in refinery operation, such as pumps, valves, pressure gauges, and compressors, whose description is not necessary to an understanding of the invention, have been omitted.

DETAILED DESCRIPTION OF THE INVENTION

The zeolite of the present invention may be prepared from a crystalline aluminosilicate zeolite of the Y type, the Y type zeolites being well known and described, for example, in U.S. Pat. No. 3,130,007, herein incorporated by reference in its entirety. Most usually, the zeolite Y starting material is in the sodium form, containing between about 10 and 14% by weight sodium calculated as $Na_2O$. In addition, the Y zeolite starting material will have a silica-to-alumina ratio above 3, and most usually and preferably between about 3 and 6.

In accordance with this invention, the Y zeolite starting material is partially ion-exchanged with rare earth metal cations. If, as is preferred, the starting material is a sodium Y zeolite, the ion exchange is such that the resultant zeolite contains a rare earth metal and at least some sodium, but usually less than about 5% by weight, calculated as $Na_2O$. The rare earth metals selected for exchange into the zeolite may be any one or any combination of the lanthanide elements having atomic numbers according to the Periodic Table of Elements between 57 and 71. Thus, the metals suitable for ion exchange herein include lanthanum, cerium, praseodymium, neodymium, samarium, europium, gadolinium, terbium, dysprosium, holmium, erbium, thulium, ytterbium, and lutetium. In the most preferred embodiment of the invention, a mixture of rare earth cations is introduced into the zeolite, with the mixture often containing rare earth metals in a distribution similar to that of the rare earth ore (e.g., bastnaesite, monazite, xenotime, and the like) from which the metals were derived.

There are many known methods by which one can exchange rare earth cations for sodium and other cations in a crystalline aluminosilicate zeolite. The most usual way is to contact the zeolite with an aqueous solution containing multivalent cations of the rare earth element or elements to be exchanged into the zeolite. Most often, the solution will contain more than about 20 grams per liter of rare earth metal cations ( calculated as $RE_2O_3$ where RE is the sum of all rare earth metals under consideration, regardless of whether any one or more of such metals actually forms a trioxide of equivalent formula), and the contacting is usually accomplished by immersing the zeolite into the ion-exchange solution and heating the resultant solid-liquid mixture, with stirring, to a temperature above ambient but usually to no more than about 100° C. If desired, the solution may also contain ammonium ions, and the solution may further contain any of a number of anions that will not interfere with the cation exchange, e.g., chloride, nitrate, sulfate, etc.

For best results, the ion exchange is performed in a manner such that the resulting zeolite contains less than about 5% by weight of sodium, usually between 1 and 5% by weight of sodium, calculated as $Na_2O$, and usually at least about 2%, preferably at least about 5%, by weight of rare earth metals, calculated as $RE_2O_3$. Normally, only a single immersion of the zeolite into the ion exchange solution will be sufficient for the necessary exchange. However, it is well within the scope of the invention to carry out the ion exchange by several immersions into a solution containing rare earth metal cations, or by immersion serially into several solutions of differing rare earth element content, or by other known methods for introducing rare earth metal cations into a zeolite.

After ion exchange, the rare earth-containing Y zeolite, which is usually and preferably a sodium and rare earth-containing zeolite Y, is subjected to a calcination treatment. The calcination treatment is preferably accomplished in the presence of steam and may be termed a steam calcination. The steam calcination is accomplished by heating the zeolite in the presence of water vapor to at least about 600° F., usually between about 900° and 1600° F., and preferably in the range of about 1100° to 1350° F. The water vapor partial pressure during the steam calcination is generally above about 0.2 p.s.i.a., usually above 1.0 p.s.i.a., preferably between 2 and 15 p.s.i.a., and more preferably still between 5 and 15 p.s.i.a. In the most preferred embodiment, the steam calcination is performed in the presence of a gaseous atmosphere consisting essentially of water vapor.

The steam calcination is generally carried out for a time period correlated with the severity of the calcination conditions, especially the water vapor partial pressure and calcination temperature, so as to effect at least some reduction in the unit cell size of the zeolite but without resulting in substantial degradation of the zeolite crystal structure. The usual unit cell size of the zeolite prior to steam calcination is between about 24.65 and 24.75 Å and after steam calcination is most often between about 24.20 and 24.64 Å, preferably between about 24.40 and 24.64 Å. However, steam calcination conditions known to be effective in the invention, regardless of resultant unit cell size, are a calcination temperature of 1100° to 1350° F. maintained for one to two hours at essentially atmospheric pressure in the presence of water vapor at a partial pressure above about 12 p.s.i.a. These conditions are particularly effective with respect to a sodium Y zeolite converted to the rare earth exchanged form by slurrying the zeolite in an aqueous solution containing 35 to 120 mg. per ml. of total dissolved rare earth elements, calculated as the individual metals. In this embodiment of the invention, the slurry will usually comprise one gram of zeolite per 3 to 4 milliliters of solution.

It will be found that the steam calcination treatment may be effectuated by any of a number of procedures. In one method, the wet zeolite from the rare earth exchange step is merely heated in an enclosed vessel preventing the escape of water vapor generated therein. Alternatively, the wet zeolite, with or without added water, may be heated in an autoclave equipped with a pressure relief valve such that super-atmospheric pressures of steam can be maintained therein. Alternatively still, the zeolite may be introduced into a batch or continuous rotary furnace, or a static bed calcination zone, into which preheated steam or humidified air is introduced. For commercial purposes, it is expected that the most useful and convenient method for steam calcining the zeolite is by introduction of preheated steam into a continuously rotating furnace.

Subsequent to the steam calcination, the zeolite is ion-exchanged with ammonium ions to lower the sodium content of the zeolite still further, usually until the sodium content is less than about 0.5% by weight, preferably less than 0.2% by weight, and most preferably less than about 0.05% by weight, calculated as $Na_2O$. Ordinarily, the ion exchange is such that at least 25%, often at least 50%, of the residual zeolitic sodium ions in the zeolite are exchanged with ammonium ions.

The ammonium ion exchange may be accomplished by methods analogous to those described hereinbefore with respect to the rare earth cation exchange. That is, the ammonium ion exchange may be accomplished by contacting the zeolite with an ammonium ion-containing solution. Usually, the zeolite is stirred for one to five hours at temperatures above ambient but less than about 100° C. in an aqueous solution containing a dissolved ammonium salt, as for example, ammonium nitrate, ammonium sulfate, ammonium chloride, and the like.

Ordinarily, to achieve extremely low sodium levels in the final zeolite, it will prove necessary to repeat the ion exchange procedure at least once if sodium levels below about 0.05 weight percent (calculated as $Na_2O$) are desired. More often, the ion exchange procedure will be repeated at least twice, and occasionally several times, before reductions in sodium content below 0.05 weight percent are achieved.

After the ammonium ion exchange, the zeolite is separated from the ion exchange solution, washed free of any residual ion exchange solution, and then heated at 100° to 200° C. for a time period sufficient to produce a dried product. Usually, time periods of one to two hours prove effective.

The dried zeolite product containing ammonium cations and rare earth metal cations is useful as a molecular sieve, as for example in dehydrating gases containing water vapor or for separating normal paraffins from isoparaffins. The zeolite product is also useful in the catalysis of hydrocarbon conversion reactions, especially with respect to acid catalyzed hydrocarbon conversion reactions, such as cracking, alkylation, isomerization, etc., or for acid catalyzed reactions coupled with hydrogenative reactions, such as hydrocracking, hydroisomerization, and the like. For cracking, alkylation, and other non-hydrogenative reactions, the zeolite is ordinarily dispersed in a porous refractory oxide matrix usually composed of alumina, silica, magnesia, beryllia, zirconia, titania, thoria, chromia, or combinations thereof. Also useful are silica-alumina, silica-zirconia, and the like. For hydrocracking and other combined hydrogenative-acid catalyzed reactions, one or more hydrogenation components are further added, with Group VIB and VIII metals, often in combination, being utilized for this purpose.

When used for catalytic hydrocarbon conversion purposes, the zeolite of the invention is, at some point in the catalyst preparation procedure, calcined at an elevated temperature, usually in the 600° to 1600° F. range, preferably in the 900° to 1500° F. range. This calcination procedure may be applied to the dried zeolite product prior to admixture with other catalytic materials or, as is more often the case, to the zeolite when further combined with a precursor of the desired refractory oxide (for instance, alumina gel in the case of alumina, silica gel in the case of silica, etc.), or with a salt containing the one or more desired hydrogenation metals, or with both. Calcination after admixture with other catalytic materials serves several purposes at once. In addition to converting the zeolite of the invention to a form more active for acid catalyzed hydrocarbon conversion reactions by the decomposition of the ammonium ions to hydrogen ions and hydroxyl groups, calcination will further convert the refractory oxide precursor to its desired form, e.g., gamma alumina, and the hydrogenation metal salt to the corresponding metal oxide.

The zeolites of the present invention, although useful in a wide variety of hydrocarbon conversion catalysts, find especial usefulness in hydrocracking catalysts. As stated hereinbefore, the typical hydrocracking catalyst of the invention contains one or more hydrogenation metal components, a porous refractory oxide, and the zeolite of the invention. Ordinarily, the hydrogenation metal chosen is a Group VIII metal, with at least some of said Group VIII metal being incorporated into the zeolite by cation exchange after the ammonium ion exchange or after a calcination subsequent to the ammonium ion exchange. If desired, a Group VIB metal, and particularly molybdenum, may also be ion-exchanged into the zeolite, as for example by the method disclosed in U.S. Pat. No. 4,297,243, herein incorporated by reference. More commonly, however, if a Group VIB metal is utilized, it is usually introduced after the zeolite is admixed with a refractory oxide component, the usual procedure being to calcine the admixture, impregnate with a solution containing the Group VIB metal in an anionic form, such as ammonium heptamolybdate, and calcining again. Normally, the Group VIII metal will be introduced by cation exchange prior to admixture with the refractory oxide component, but, if desired one may introduce the Group VIII metal in cationic form into the zeolite by impregnation at a time subsequent to admixing the zeolite and refractory oxide but prior to the final calcination.

The most preferred zeolite of the invention for use in hydrocracking catalysts contains a noble metal as the Group VIII hydrogenation metal. The noble metals are selected from the group consisting of platinum, palladium, rhodium, iridium, ruthenium, and osmium, but the preferred noble metals are platinum and palladium, with palladium being most preferred. The noble metal, or combination of noble metals, is dispersed in the zeolite by cation exchange, as for example, by contacting the dried rare earth-ammonium zeolite described above with an aqueous solution having platinum dichloride or palladium dichloride dissolved therein. To facilitate the ion exchange, ammonium ions are usually also introduced into the aqueous solution, as by the addition of ammonium hydroxide. The ion exchange is usually such as to introduce at least about 0.1% by weight, preferably between 0.1 and 2.0% by weight of noble metal, calculated as the metal, into the zeolite, which zeolite, from previous ion exchanges, contains one or more rare earth metals in a proportion usually above about 2 percent by weight, preferably above about 5 percent by weight, calculated as $RE_2O_3$, and further containing sodium in very small proportions, usually below about 0.5 percent by weight, preferably below about 0.05 percent by weight.

After incorporation of the noble metal into the zeolite by the foregoing or equivalent methods, the zeolite is combined with a refractory oxide component. For example, the noble metal-rare earth-ammonium zeolite may be admixed with peptized alumina, alumina gel, or hydrated alumina, usually in amounts such that the zeolite comprises between 50 and 90% by weight of the admixture. The admixture is then formed into particulates, as by extrusion through a die having openings of a cross-sectional size and shape desired in the final catalyst particles followed by incision of the extruded matter into lengths of about 1/16 to ½ inch. The resulting particulates are then subjected to a calcination at an elevated temperature, usually between about 600° and 1600° F., to produce catalytic particles of high crushing strength.

Other methods for producing a particulate hydrocracking catalyst containing a noble metal dispersed in the zeolite are also applicable. For example, the dried rare earth-ammonium Y zeolite described hereinabove may be admixed with a refractory oxide component, such as alumina gel, and the resulting admixture may then be calcined, followed by impregnation with an ammonical solution containing platinum palladium, or other noble metal in a cationic species. Such an impregnation, while distributing some of the noble metal upon the porous refractory oxide, also results in the introduction of noble metal into the ion exchange sites of the zeolite, and a subsequent calcination converts the exchanged noble metal into the oxide form. Alternatively still, the zeolite may be admixed with a solid noble metal salt (again containing the noble metal in a cationic species), a porous refractory oxide precursor, and sufficient water containing ammonium hydroxide into a paste suitable for extrusion or molding into the desired particulate size and shape. During the mixing and extruding (or molding) operations, at least some of the noble metal will exchange into the zeolite and become dispersed therein.

Noble metal hydrocracking catalysts prepared by the foregoing or essentially equivalent procedures are characterized by the presence of one or more noble metals on a support comprising a porous refractory oxide plus a Y-type zeolite containing hydrogen cations and one or more rare earth metals, with at least some of said noble metal being contained within the zeolite. The most preferred catalyst consists essentially of alumina combined with a palladium-containing, rare earth-containing, and hydrogen ion-containing zeolite, with the zeolite having been prepared, as described above, by a method including the steps of rare earth cation exchange followed by a steam calcination and subsequent ammonium ion and noble metal cation exchanges.

Hydrocracking catalysts prepared with the zeolite of the invention are useful in the conversion of a wide variety of hydrocarbon feedstocks to a hydrocarbon product of lower average boiling point and molecular weight. The feedstocks that may be subjected to hydrocracking by the method of the invention include all mineral oils and synthetic oils (e.g., shale oil, tar sand products, etc.) and fractions thereof. Illustrative feedstocks include straight run gas oils, vacuum gas oils, and catcracker distillates. The typical hydrocracking feedstock, however, contains a substantial proportion of components, usually at least 50% by volume, often at least 75% by volume, boiling above the desired end point of the product, which end point, in the case of gasoline, will generally be in the range of about 380° to 420° F. Usually, the feedstock will also contain gas oil components boiling above 550° F., with highly useful results being achievable with feeds containing at least 30% by volume of components boiling between 600° and 1000° F.

For best results in hydrocracking, the catalyst of the invention will be employed as a bed of catalytic particulates in a hydrocracking reactor vessel into which hydrogen and the feedstock are introduced and passed in a downwardly direction. Operating conditions in the reactor vessel are chosen so as to convert the feedstock into the desired product, which, in the preferred embodiment, is a hydrocarbon product containing a substantial proportion of gasoline components boiling, for example, in the 185° to 420° F. range. However, other products, such as turbine fuel or diesel fuel, may also be desired on occasion, and conditions must be adjusted according to the product (or distribution of products) desired. The exact conditions required in a given situation will depend upon the nature of the feedstock, the particular catalyst composition utilized, and the desired product(s). But in general, the conditions of operation will fall into the following suitable and preferred ranges:

TABLE I

| Conditions | Suitable | Preferred |
| --- | --- | --- |
| Temperature, °F. | 450–850 | 500–800 |
| Pressure, psig | 750–3500 | 1000–3000 |
| LHSV | 0.3–5.0 | 0.5–3.0 |
| $H_2$/Oil, MSCF/bbl as measured at 60° F. and 1 atmosphere | 1–10 | 2–8 |

The noble metal hydrocracking catalyst of the invention will find especial use in a hydrocracking reactor vessel wherein an ammonia deficient atmosphere is maintained. In the usual instance, an essentially nitrogen-free fluid, comprising hydrogen plus a denitrogenated hydrocarbon feedstock containing hydrocarbon components boiling above a maximum desired temperature, as for example, above 420° F. when a gasoline product boiling below about 420° F. is required, is contacted with the noble metal catalyst of the invention under hydrocracking conditions converting a substantial proportion of the 420° F.+ hydrocarbon components to product components boiling in the desired gasoline range. Under such ammonia-deficient conditions, it has been found that prior art catalysts comprising a noble metal-exchanged zeolite cracking component lose substantial activity after coke and coke-like materials, which deposit on the catalyst under hydrocracking conditions, are removed therefrom by a combustive regeneration treatment. It is believed that such activity losses are due to the migration and subsequent agglomeration of the active noble metals, but whatever the chemical mechanism by which such losses occur in the prior art catalysts, the catalyst of the present invention comprising a zeolite containing an exchanged rare earth metal and a noble metal resists deactivation and is regenerable by combustion of coke deposits without encountering activity losses.

It is, therefore, a specific embodiment of the invention to employ the hydrocracking catalyst of the invention, and particularly the noble metal hydrocracking catalyst of the invention, in a hydrocracking reactor vessel wherein a hydrocarbon feedstock is treated under ammonia-deficient and preferably essentially ammonia-free hydrocracking conditions. By ammonia-deficient, it is intended to mean the presence of no more than 200 ppmv ammonia in contact with the catalyst, and by essentially ammonia-free, it is intended to mean the presence of no more than 20 ppmv ammonia in contact with the catalyst. In both ammonia-deficient and essentially ammonia-free hydrocracking environments, and also in essentially completely ammonia-free environments wherein the ammonia content in contact with the catalyst is present in only trace amounts not exceeding 3 ppmv, the catalyst of the invention proves to be a regenerable catalyst resistant to hydrocracking activity losses when coke deposits are removed from the catalyst by combustion.

Accordingly, it is yet another specific embodiment of the invention to employ the hydrocracking catalyst of the invention in a refining process wherein a hydrocarbon feedstock is treated by an integral hydrotreating-hydrocracking operation followed by further hydrocracking of unconverted hydrocarbon components in an ammonia-deficient hydrocracking zone. The hydrocracking catalyst of the invention is employed in the ammonia-deficient hydrocracking zone, and also, if desired, in the first hydrocracking zone utilized in integral operation. In this refining process, which is shown schematically in the flow diagram of the drawing, the hydrocarbon feedstock carried in conduit 1 is generally a gas oil boiling above about 550° F., usually in the range of 550° to 1200° F. After blending with a hydrogen-containing gas from conduit 2, the feedstock-hydrogen blend is then passed by conduit 3 into a suitable reactor vessel 4 wherein the feedstock is subjected to catalytic hydrotreating in hydrotreating zone 5 maintained under conditions falling in the following ranges:

TABLE II

| Operating Conditions | Suitable | Preferred |
|---|---|---|
| Temperature, °F. | 400–1,000 | 650–800 |
| Pressure, p.s.i.a. | 100–5,000 | 500–2,000 |
| Space Velocity, LHSV | 0.1–15 | 2–7 |
| Hydrogen Recycle Rate, cf/bbl as measured at 60° F. and 1 atmosphere | 400–20,000 | 4,000–10,000 |

The catalyst utilized to promote the hydrotreating reactions is generally composed of a Group VIII hydrogenation metal component in combination with a Group VIB hydrogenation metal component, oftentimes in conjunction with an additional acid component, such as phosphorus, supported on an amorphous, porous refractory oxide support such as alumina. A preferred hydrotreating catalyst comprises a sulfided, particulate composition comprising a nickel or cobalt component, preferably a nickel component in a proportion between about 2 and 6 percent by weight (calculated as NiO), a molybdenum or tungsten component, preferably a molybdenum component in a proportion between about 12 and 30 percent by weight (calculated as $MoO_3$), and a phosphorus component present in a proportion between about 2 and 6 percent by weight (calculated as P) on a support consisting essentially of alumina or alumina in combination with a small amount of silica. The catalyst is generally employed as a bed of particulates through which the feedstock and hydrogen are passed downwardly under conditions usually selected from those shown in Table II so as to convert the organonitrogen components in the feedstock to ammonia and the organosulfur components to hydrogen sulfide. All the products recovered from the hydrotreating stage are passed through a catalytic hydrocracking zone 6, which zone may, as shown in the drawing, be maintained in the lower portion of the same vessel containing the hydrocracking catalyst. Alternatively, the hydrocracking zone may be maintained in an entirely different reactor vessel. In either event, the entire effluent from the hydrotreating zone is passed through a bed of hydrocracking catalyst particles under conditions usually selected from those shown in Table I so as to convert a specified percentage of the hydrotreated feedstock, as for example, 60% by volume, to products boiling below a specified boiling end point, 400° F. being illustrative for many gasolines. The catalyst employed in hydrocracking zone 6 may be either the catalyst of the invention or a conventional catalyst, but if a conventional catalyst is chosen, it is preferred that it be a catalyst containing a noble metal-exchanged, stabilized Y zeolite, such as that designated as Catalyst A in Example 16 of U.S. Pat. No. 3,897,327.

It is noted that hydrocracking zone 6, due to the heat generated by the exothermic reactions occurring therein, is provided with a hydrogen-containing quench gas supplied through lines 7 and 8 from header 9. It is further noted that, in the preferred embodiment, the operating pressures in hydrocracking zone 6 and hydrotreating zone 5 are substantially the same, whether the two zones are maintained in the same reactor vessel as shown in the drawing or in separate reactor vessels. Operating in this manner obviates pressure-reducing or pressure-increasing equipment between the hydrotreating and hydrocracking zones.

After hydrocracking, ammonia produced in hydrotreating zone 5 and carried through hydrocracking zone 6 is separated from the other hydrocrackate products recovered in conduit 10. This is accomplished by combining the hydrocrackate products carried in conduit 10 with those obtained via conduit 33 from a second hydrocracking zone maintained in hydrocracking vessel 25, hereinafter discussed in fuller detail, and then passing the resultant mixture by conduit 11 to appropriate facilities for absorbing ammonia by a water-washing operation 12 utilized in conjunction with high pressure separation. Water is introduced by conduit 13, and sour water, containing essentially all the ammonia originally present in the hydrocrackate products and some of the hydrogen sulfide which was also originally present therein, is removed by conduit 14.

Also recovered from the water-washing operation are a hydrocarbon liquid and a hydrocarbon recycle gas containing hydrogen, hydrogen sulfide, and light hydrocarbon gases. These products are collected respectively in conduits 15 and 16, with the hydrocarbon liquid being then transferred to low pressure separator 17. From separator 17, a low BTU gas containing $C_1$ to $C_3$ hydrocarbons plus essentially all the hydrogen sulfide carried into separator 17 by conduit 15, is recovered by conduit 18 while a liquid product, typically boiling at temperatures at or above that of $C_4$ hydrocarbons, is obtained in conduit 19. This $C_4+$ liquid product, which is essentially free of nitrogen and sulfur components, is introduced into distillation column 20 and therein separated into a gasoline product, boiling, for example, in the $C_4$ to 400° F. range, and an unconverted bottom fraction boiling primarily above 400° F. (or other desired end point of the gasoline product). From distillation column 20, the gasoline product is recovered by conduit 21 while the unconverted bottom fraction is recovered by conduit 22, the latter then being blended by conduit 23 with a portion of the hydrogen recycle gas carried in conduit 16, with the resulting blend then being passed on by conduit 24 to hydrocracking vessel 25. Also introduced into hydrocracking vessel 25 is a hydrogen quench gas from header 9 by conduits 26, 27, 28, and 29, which hydrogen quench gas is supplied by blending the recycle gas from conduits 16 and 30 with hydrogen make-up from conduit 31. The blending takes place in conduit 32, which serves as a common source of added hydrogen for reactor vessels 4 and 25.

In hydrocracking vessel 25 is maintained a second hydrocracking reaction zone utilizing the hydrocracking catalyst of the invention and preferably the noble metal catalyst of the invention. In this second hydrocracking reaction zone, ammonia-deficient conditions, and preferably essentially ammonia-free, and more preferably still, essentially completely ammonia-free hydrocracking conditions, are maintained. Due to the reduced ammonia content in comparison to the first hydrocracking reaction zone 6 (wherein ammonia concentrations of 2000 ppmv or higher are usually maintained), the hydrocracking conditions employed in hydrocracking vessel 25 are less severe, and substantially lower operating temperatures may be utilized while achieving high conversions (e.g., 60 volume percent or better) to products boiling below the desired end point. Thus, the conditions for operation in the second hydrocracking reaction zone may be selected from those shown in Table I but will, overall, be less severe than those required in the hydrocracking zone associated with integral operation. Usually, the operating temperature in hydrocracking vessel 25 is between about 450° and 600° F. whereas the operating temperature in hydrocracking zone 6 is higher, generally between about 600° and 850° F.

It should be noted, however, that although the conditions in hydrocracking reactor vessel 25 are preferably ammonia-deficient at all times, one can, in less preferred embodiments of the invention, maintain reactor vessel 25 under ammonia-rich conditions, for example, under conditions similar to those maintained in hydrocracking zone 6. Such operation, of course, requires conditions of increased severity, and for that reason, ammonia-rich conditions in reactor vessel 25 are generally avoided. But there will be many instances when, even under planned ammonia-deficient conditions, a petroleum refiner may temporarily require the use of ammonia-rich conditions in reactor 25. Generally, however, such conditions will be permitted for only short periods of time, and in the most usual situation, the ammonia content in reactor vessel 25 over a 30-day time period will average less than 200 ppmv, i.e., the operation will be under average ammonia-deficient conditions.

COMPARATIVE EXAMPLE

This Example demonstrates the hydrocracking activities of the catalyst of the invention and a comparative catalyst in ammonia-deficient hydrocracking environments. The activities are compared both before and after the catalysts are regenerated by combustion of coke.

The comparative catalyst is composed of 80% zeolite and 20% alumina, with sufficient palladium exchanged into the zeolite such that the catalyst composition contains 0.54% by weight palladium (calculated as the metal). The catalyst is prepared in a manner similar to that of Catalyst A described in Example 16 of U.S. Pat. Nos. 3,897,327 and 3,929,672, both herein incorporated by reference in their entirety. The catalyst has a compacted bulk density of 0.64 gm/cc. and is in the form of $\frac{1}{8}$ inch diameter cylindrical extrudates.

A catalyst of the present invention is then prepared in accordance with the following procedure: 180 gm. of rare earth chloride is dissolved in 150 ml of deionized water. The rare earth chloride contains a mixture of rare earth elements in the following proportions calculated as the oxides: 50 weight percent $CeO_2$, 33 weight percent $La_2O_3$, 12 weight percent $Nd_2O_3$, 4 weight percent $Pr_6O_{11}$, and 1 weight percent other rare earth elements, calculated as $RE_2O_3$. The resulting rare earth solution is filtered to remove insoluble materials, and 130 ml of the filtrate is then added to a suspension of 500 gm. sodium Y zeolite in 1500 ml of water. The slurry thus formed is heated to about 80° to 90° C. with stirring for one hour, after which the zeolite is separated from the slurry by filtration and washed free of chloride with deionized water. Two hundred-eighty grams of the resultant rare earth-exchanged zeolite, containing 6.9 percent by weight of rare earth oxides (calculated as $RE_2O_3$, is then heated in a preheated furnace at 670° C. for one and one-half hours in the presence of flowing steam. The steamed product is then ion-exchanged with ammonium ions by immersion for three hours at 80° to 90° C. in a solution composed of 200 gm. ammonium nitrate dissolved in 500 ml deionized water. This procedure is repeated twice more, after which the ammonium-exchanged zeolite is recovered by filtration, washed with deionized water to remove all trace of nitrates, and then subjected to a temperature of 110° C. for a time period sufficient to produce a dried product containing about 0.03% by weight sodium (calculated as $Na_2O$) and having a unit cell size of 24.577 Å. The zeolite is then ion-exchanged with palladium by first dissolving 2.30 grams of palladium dichloride in a liquid composed of 30 ml of concentrated (33%) ammonium hydroxide and 200 ml water and then adding all of the resultant Pd-containing solution, in dropwise fashion and with stirring, to a suspension of 200 grams of zeolite in a solution containing 500 ml of deionized water and 25 ml of concentrated ammonium hydroxide. After standing overnight, the suspension (or slurry) is filtered to yield a palladium-containing zeolite, which is washed with deionized water and dried. This dried product is then admixed with peptized Catapal TM alumina, with the proportion of alumina in the admixture being equal to 20% of the weight of the zeolite. After extrusion through a die having 1/16 inch circular openings therein, the extruded matter is cut into $\frac{1}{8}$ to $\frac{1}{2}$ inch lengths and calcined in flowing air at 800° F. for one hour. The resulting catalyst has a compacted bulk density of 0.59 gm/cc, a surface area of 645 m²/gm, a sodium content (as $Na_2O$) of 0.031% by weight, a rare earth metal content of 5.01% by weight (calculated as $RE_2O_3$), and a palladium content of 0.57% by weight, calculated as the metal. The zeolite contained in the catalyst is found to have a unit cell size of 24.553 Å.

The catalysts are then evaluated for hydrocracking activity in two separate runs wherein a gas oil feed plus added hydrogen is passed through a laboratory-sized reactor vessel containing 150 cc. of catalyst under the following conditions: 1450 p.s.i.a., 1.7 LHSV, and a hydrogen-to-oil ratio of 8000 SCF/bbl. The gas oil feed is a denitrogenated, desulfurized, unconverted fraction obtained from a previous integral hydrofining-hydrocracking operation; it has an API gravity of 38° and a boiling range of 360° to 870° F., with about 12 percent by volume of the feed boiling below 400° F. To simulate hydrocracking in an $H_2S$-containing atmosphere, thiophene is blended with the feedstock so as to provide a sulfur concentration therein of 0.5 weight percent. The operating temperature utilized in the reactor vessel is adjusted periodically to maintain a total liquid product gravity of 49.5° API, which, by previously established correlations, corresponds to a 60 volume percent conversion of the feedstock to a $C_4$ to 400° F. gasoline product. The temperatures required to maintain this conversion after 100 hours on stream are 519° F. for the catalyst of the invention and 512° F. for the comparative catalyst, which data indicate that the two catalysts have roughly equivalent hydrocracking activity prior to regeneration.

To provide data relative to the activities of the catalysts after regeneration, the catalysts are each coked at the end of their individual runs. The coking is accomplished by changing the hydrocracking conditions from ammonia-deficient to ammonia-rich, thereby requiring more severe conditions to produce the desired $C_4$ to 400° F. gasoline product. The ammonia-deficient conditions are changed to ammonia-rich conditions by introducing into the hydrocracking reactor vessel tert-butyl amine at a rate equivalent to about 1 gram of nitrogen per 200 grams of feed. The reactor temperature is then increased (without changing other conditions) so as to produce and maintain the requisite 60 volume percent conversion to a C₄ to 400° F. gasoline product over about a 125 to 150 hour time period, at the end of which the catalysts are in a coked condition.

After coking, the catalysts are regenerated by a controlled oxidative combustion at temperatures ranging from about 700° to 1000° F. utilizing a flowing regeneration gas consisting essentially of nitrogen and oxygen. The oxygen content of the regeneration gas is increased from 0.1 to 3.0 volume percent as necessary to maintain a water vapor partial pressure in the gaseous combustion products at values below about 0.25 p.s.i.a. The regenerated catalyst particles are then activity-tested in accordance with the activity test described above, and the catalyst of the invention is found useful for producing the required C₄ to 400° F. gasoline product at an operating temperature of 510° F. in comparison to 540° F. for the comparative catalyst. These data establish that the catalyst of the invention is substantially more active after regeneration than is the case for the comparative catalyst. Indeed, as shown by the following Table III summarizing the data obtained in the foregoing experiments:

TABLE III

| Catalyst | Temperature Required for 60% Conversion |
|---|---|
| Comparative Catalyst Prior to Regeneration | 512° F. |
| Comparative Catalyst After Regeneration | 540° F. |
| Catalyst of Invention Prior to Regeneration | 519° F. |
| Catalyst of Invention After Regeneration | 510° F. | it will be seen that the catalyst of the invention actually exhibited a 9° F. increase in catalytic activity during regeneration while the comparative catalyst demonstrated a 28° F. drop in catalytic activity. And the 30° F. differential between the catalyst of the invention and the comparative catalyst after regeneration indicates that the catalyst of the invention is more than twice as active after regeneration as the comparative catalyst. For example, the catalyst of the invention could be used under the same conditions as the comparative catalyst and produce similar results while treating the same feedstock but at more than twice the space velocity.

It should also be noted in the experiment of the Comparative Example that the catalyst of the invention and the comparative catalyst were both coked under ammonia-rich conditions. And since the data after regeneration indicate that the catalyst of the invention is highly active, indeed even more so than the comparative catalyst, it is evident that the catalyst of the invention resists catalytic deactivation in the presence of ammonia. In addition, the zeolite used in the catalyst of the invention resists crystal collapse under ammonia-rich hydrocracking conditions and is therefore ammonia-stable. Further still, due to its method of preparation, wherein a Y zeolite is calcined, preferably by a steam calcination, between rare earth cation and ammonium ion exchanges, the zeolite of the invention is hydrothermally stable, resisting crystal collapse at elevated temperatures in the presence of water vapor, and particularly under the hydrothermal conditions prevailing under usual hydrocracking conditions.

Although the invention has been described in conjunction with a comparative example and by reference to several embodiments of the invention, including a preferred embodiment, it is evident that many alterations, modifications, and variations will be apparent to those skilled in the art in light of the foregoing description. Accordingly, it is intended in the invention to embrace these and all such alternatives, modifications, and variations as may fall within the spirit and scope of the appended claims.

I claim:

1. A zeolite produced by a method comprising cation-exchanging a crystalline aluminosilicate zeolite of the Y type with rare earth-containing cations, calcining the resultant rare earth-exchanged zeolite in the presence of water vapor at a partial pressure of at least about 0.2 p.s.i.a., ion-exchanging the calcined product with ammonium ions, and subsequently ion-exchanging with Group VIII metal cations.

2. A zeolite produced by a method comprising cation-exchanging a crystalline aluminosilicate zeolite of the Y type with rare earth-containing cations, calcining the resultant rare earth-exchanged zeolite in the presence of water vapor at a partial pressure of at least about 0.2 p.s.i.a., ion-exchanging the calcined product with ammonium ions followed by calcining, and subsequently ion-exchanging with Group VIII metal cations.

3. A zeolite produced by a method comprising cation-exchanging a crystalline aluminosilicate zeolite of the Y type with rare earth-containing cations, calcining the resultant zeolite in the presence of water vapor at a partial pressure of at least about 0.2 p.s.i.a., ion-exchanging the calcining product with ammonium ions, and subsequently ion exchanging with cations containing a noble metal.

4. A zeolite as defined in claim 3 wherein said zeolite initially is a sodium Y zeolite and said calcining is accomplished in the presence of water vapor at a partial pressure above 1.0 p.s.i.a.

5. A zeolite as defined in claim 4 wherein after said noble metal cation exchange, the zeolite contains less than about 0.05 percent by weight of sodium, calculated as Na₂O.

6. A zeolite as defined in claim 4 or 5 wherein said noble metal is palladium or platinum.

7. A zeolite as defined in claim 4 or 5 wherein the zeolite, after said noble metal exchange, contains at least about 2 percent by weight of rare earth metals, calculated as RE₂O₃.

8. A zeolite as defined in claim 4 wherein said calcining is carried out at a temperature between about 1100° and 1350° F. and a water vapor partial pressure above about 12 p.s.i.a.

9. A zeolite as defined in claim 8 wherein, after said ammonium ion exchange, the zeolite is exchanged with noble metal cations, with the resulting zeolite containing at least about 2.0 percent by weight rare earth metals, calculated as RE₂O₃, less than about 0.5 percent by weight of sodium, calculated as Na₂O, and at least about 0.1 percent by weight of total noble metals, calculated as the metals.

10. A zeolite containing a rare earth metal and a noble metal prepared by a method comprising cation exchanging a sodium Y zeolite with cations containing one or more rare earth metals but retaining at least some residual sodium ions, calcining the resultant rare earth-exchanged zeolite in the presence of water vapor at a partial pressure of at least about 0.2 p.s.i.a. and at a temperature between about 600° and 1600° F. so as to result in at least some shrinkage of the unit cell size of the zeolite, ion exchanging the resultant zeolite with ammonium ions so as to reduce the residual sodium content thereof to below about 0.5 percent by weight, calculated as $Na_2O$, and subsequently ion-exchanging with cations containing a noble metal.

11. A zeolite as defined in claim 10 wherein the unit cell size of said zeolite after said calcination is between about 24.20 and 24.64 Å.

12. A zeolite as defined in claim 10 wherein the unit cell size of said zeolite after said calcination is between about 24.40 and 24.64 Å.

13. A zeolite as defined in claim 12 wherein at least 25% of the residual sodium ions are removed by ion exchange with said ammonium ions.

14. A zeolite as defined in claim 10, 12, or 13 wherein said noble metal is platinum or palladium.

15. A zeolite as defined in claim 12 wherein said zeolite, after said ammonium ion exchange, contains less than about 0.5 percent by weight sodium, calculated as $Na_2O$.

16. A zeolite as defined in claim 12 wherein said zeolite, after said ammonium exchange but prior to said noble metal exchange, is calcined.

17. A zeolite as defined in claim 15 wherein said calcination is carried out in the presence of water vapor at a partial pressure between about 2 and 15 p.s.i.a.

18. A zeolite as defined in claim 17 wherein said zeolite after said ammonium ion exchange contains less than 0.05 percent by weight sodium.

19. A zeolite as defined in claim 12, 16, or 17 wherein said zeolite after said ammonium ion exchange contains at least 5 percent by weight of rare earth metals, calculated as $RE_2O_3$.

20. A zeolite as defined in claim 17 wherein said zeolite after said rare earth cation exchange contains more than about 1 percent by weight sodium.

21. A catalyst useful in hydrocarbon conversion reactions involving hydrogenation, said catalyst being prepared by admixing the zeolite of claim 1, 2, 3, 4, 10, 12, or 16 with a refractory oxide component and calcining.

22. A catalyst useful in hydrocracking prepared by admixing the zeolite of claim 14 with a refractory oxide component and calcining.

23. A hydrocracking catalyst comprising a zeolite containing a rare earth metal, Group VIII metal, and hydrogen ions, said catalyst being prepared by a method including the steps of cation exchanging a Y-type zeolite with rare earth-containing cations, calcining the resultant rare earth-exchanged zeolite in the presence of water vapor at a partial pressure of at least 0.2 p.s.i.a., ion-exchanging the calcined product with ammonium ions, subsequently admixing with a refractory oxide component, calcining the resulting admixture so as to convert at least some of the ammonium ions to hydrogen ions, impregnating the calcined admixture with a solution containing Group VIII metal cations under conditions such that at least some Group VIII metal cations are exchanged into the zeolite contained in the calcined admixture, and again calcining.

24. A hydrocracking catalyst prepared by a method including the steps of:
(1) cation exchanging a sodium Y zeolite with rare earth cations such that the resultant zeolite contains at least about 2 percent by weight of rare earth metals, calculated as $RE_2O_3$, but still retains at least some sodium;
(2) calcining the resultant rare earth-sodium Y zeolite in the presence of water vapor at a partial pressure of at least about 0.2 p.s.i.a. so as to effect at least some reduction in the unit cell size of said zeolite, with the resultant unit cell size being between 24.40 and 24.64 Å;
(3) ammonium ion exchanging the calcined zeolite from step (2) so as to further reduce the sodium content thereof;
(4) ion-exchanging the ammonium-exchanged zeolite from step (3) with cations containing a noble metal; and
(5) admixing the zeolite from step (4) with a refractory oxide component and calcining the resultant admixture.

25. A catalyst as defined in claim 24 wherein the zeolite in the calcined product of step (5) contains at least 2 weight percent of rare earth metals, calculated as $RE_2O_3$, and at least 0.1 weight percent of one or more noble metals, calculated as the metals.

26. A catalyst as defined in claim 25 wherein said zeolite after said rare earth cation exchange in step (1) contains no more than 5 weight percent by weight of sodium but the ammonium-exchanged zeolite from step (3) contains less than 0.5 weight percent sodium.

27. A catalyst as defined in claim 26 wherein the rare earth-sodium Y zeolite produced in step (1) contains between 1 and 5 percent by weight of sodium, calculated as $Na_2O$, and the zeolite in the calcined product of step (5) contains at least 5 weight percent rare earth metals, calculated as $RE_2O_3$.

28. A catalyst as defined in claim 24 or 27 wherein said calcination in step (2) is accomplished in the presence of an atmosphere consisting essentially of steam.

29. A catalyst as defined in claim 24, 25, or 27 wherein the noble metal exchanged into said zeolite in step (4) is palladium and said calcining in step (2) is accomplished in the presence of water vapor at a partial pressure above about 12 p.s.i.a.

30. A method for preparing an ammonia-stable and hydrothermally stable zeolite comprising cation exchanging a crystalline aluminosilicate zeolite of the Y type with cations containing a rare earth metal, calcining the resultant rare earth exchanged zeolite in the presence of water vapor at a partial pressure of at least 0.2 p.s.i.a., ion-exchanging the calcined product with ammonium ions, and subsequently ion-exchanging with cations of a Group VIII metal.

31. A method as defined in claim 30 wherein said calcining results in some shrinkage of the unit cell size of the zeolite.

32. A method as defined in claim 31 wherein said Group VIII metal is a noble metal.

33. A zeolite as defined in claim 3 wherein said calcining is carried out in the presence of water vapor at a partial pressure between about 2 and 15 p.s.i.a. under conditions such that the unit cell size of the zeolite undergoes some shrinkage.

34. A zeolite as defined in claim 33 wherein said water vapor partial pressure during said calcining is between 5 and 15 p.s.i.a., and said noble metal is platinum or palladium.

35. A zeolite as defined in claim 34 wherein said zeolite contains, due to said exchange wth the rare earth cations, at least 5 percent by weight of rare earth metals, calculated as $RE_2O_3$.

36. A zeolite as defined in claim 35 wherein said zeolite contains less than about 0.5 percent by weight of sodium, calculated as $Na_2O$, after said noble metal exchange.

37. A zeolite as defined in claim 36 wherein said calcining is carried out at a temperature of about 1100° to 1350° F. at essentially atmospheric pressure in the presence of water vapor at a partial pressure above about 12 p.s.i.a.

38. A zeolite as defined in claim 1, 2, 3, 10, or 34 wherein the rare earth cation exchange introduces a mixture of rare earth cations into said zeolite, said mixture containing cerium, lanthanum, praeseodymium, and neodymium cations.

39. A catalyst as defined in claim 23, 24, or 27 wherein the rare earth cation exchange introduces a mixture of rare earth cations into said zeolite, said mixture containing cerium, lanthanum, praeseodymium, and neodymium cations.

40. A zeolite as defined in claim 37 wherein the rare earth cation exchange introduces a mixture of rare earth cations into said zeolite, said mixture containing cerium, lanthanum, praeseodymium, and neodymium cations.

41. A zeolite as defined in claim 40 wherein said noble metal comprises palladium.

42. A zeolite as defined in claim 34, 35, 37, 40, or 41 wherein said zeolite contains less than about 0.05 percent by weight of sodium, calculated as $Na_2O$, after said noble metal exchange.

* * * * *